United States Patent
Wei et al.

(10) Patent No.: US 9,927,785 B2
(45) Date of Patent: Mar. 27, 2018

(54) DEVICE CONTROL METHOD AND SYSTEM THEREOF

(71) Applicant: XIX INC., New Taipei (TW)

(72) Inventors: Shu-Ming Wei, New Taipei (TW); Kuei-Yuan Chen, New Taipei (TW); Ming-Te Lin, New Taipei (TW); Yao-Tsung Yeh, New Taipei (TW)

(73) Assignee: XIX INC., New Taipei (TW)

( * ) Notice: Subject to any disclaimer, the term of this patent is extended or adjusted under 35 U.S.C. 154(b) by 0 days.

(21) Appl. No.: 15/135,515

(22) Filed: Apr. 21, 2016

(65) Prior Publication Data

US 2018/0004174 A1    Jan. 4, 2018

Related U.S. Application Data

(60) Provisional application No. 62/151,369, filed on Apr. 22, 2015.

(51) Int. Cl.
*G05B 15/02* (2006.01)
*H04N 21/422* (2011.01)

(52) U.S. Cl.
CPC ....... *G05B 15/02* (2013.01); *H04N 21/42222* (2013.01); *G08C 2201/20* (2013.01); *G08C 2201/32* (2013.01); *G08C 2201/91* (2013.01)

(58) Field of Classification Search
CPC .......................... G05B 15/02; H04N 21/42222
USPC ................................................ 340/10.1–10.6
See application file for complete search history.

(56) References Cited

U.S. PATENT DOCUMENTS

| 9,684,826 | B2* | 6/2017 | Dubuque | G06K 9/00536 |
| 2013/0141216 | A1 | 6/2013 | Kao et al. | |
| 2014/0324225 | A1 | 10/2014 | Lu et al. | |
| 2015/0350225 | A1* | 12/2015 | Perold | H04W 4/02 726/4 |
| 2016/0012217 | A1* | 1/2016 | Wolf | G06F 21/83 726/18 |
| 2016/0086029 | A1* | 3/2016 | Dubuque | G06K 9/00536 382/159 |

(Continued)

FOREIGN PATENT DOCUMENTS

| CN | 103186976 I | 7/2013 |
| TW | 201023546 I | 6/2010 |

(Continued)

*Primary Examiner* — Allen T Cao
(74) *Attorney, Agent, or Firm* — ScienBiziP, P.C.

(57) ABSTRACT

The present disclosure provides a device control method, which comprises capturing, by a portable device, a first image of a specific area containing a number of electronic devices connected to a communication network; transmitting a connection signal to a selected electronic device on a device list containing all the electronic devices connected to a communication network; determining whether the selected electronic device is in the first image captured based on whether a response has been received from the selected electronic device; identifying the selected electronic device on the device list and the relative position of the selected electronic device on the first image captured upon determined that the selected electronic device is in the first image; and continuing the device identification process until all the connected electronic devices on the device list has been verified, to identify the relative positions of all electronic devices contained in the first image.

20 Claims, 7 Drawing Sheets

(56) References Cited

U.S. PATENT DOCUMENTS

2016/0117749 A1* 4/2016 Desmarais ............. A41H 3/007
  382/111
2017/0169113 A1* 6/2017 Bhatnagar ......... G06F 17/30867

FOREIGN PATENT DOCUMENTS

| TW | 201319825 I | 5/2013 |
| TW | 201511570 I | 3/2015 |
| TW | 498934 M | 4/2015 |
| TW | 201513731 I | 4/2015 |

* cited by examiner

DEVICE CONTROL METHOD AND SYSTEM THEREOF

CROSS-REFERENCE TO RELATED PATENT APPLICATIONS

This application claims priority to and the benefit of U.S. Provisional Application No. 62/151,369, filed Apr. 22, 2015, incorporated herein by reference in its entirety.

TECHNICAL FIELD

The instant disclosure relates generally to a device control method and a system thereof pertains particularly to a device control method and a system thereof utilizing image recognition.

BACKGROUND

As communication and Internet of Things (IoT) technologies advanced, it has been desirable to control various electronic devices in a local area setting using a single mobile device, such as a smart phone or tablet, via network communication. Current device control mechanisms have some drawbacks. For instance, a user of a mobile device might not have a visualization for the devices linked, but rather a device list. Thus, a user can't easily identify the device to be controlled. Moreover, in order to properly setup communication channel between the mobile device and the device to be controlled, a user has to manually perform lengthy operations on the mobile device and maybe even on the device to be controlled, which may include performing device searching procedure, manually selecting the devices to be controlled and setting communication parameters and the like, while the user's operation on the device to be communicated with may include waiting for the selected device to be ready, setting communication channel parameters and the like. In additional, different electronic devices might use different control setup procedures, making the device management process even more difficult. If the user makes any errors during the control setup operation, the user might have to start over. These causes inconvenience to the user.

BRIEF DESCRIPTION OF THE DRAWINGS

Aspects of the present disclosure are best understood from the following detailed description when read with the accompanying figures. It is to be noted that various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

For consistency of purpose and ease of understanding, like features are identified (although, in some instances, not shown) with like numerals in the exemplary figures. However, the features in different embodiments may differ in other respects, and thus shall not be narrowly confined to what is shown in the figures.

Embodiments of the present disclosure provide various methods, apparatuses, and systems for providing user-behavior-oriented automated control system using cloud computing, digital communication, and Internet of Things (IoT) technologies. The following descriptions describes various embodiments related to a user behavior-oriented automated control methods, apparatuses, systems with a surface mounted multifunctional intelligent modular system merely for illustration purposes and therefore does not limit the present disclosure.

Exemplary embodiments of the present disclosure that are described in the context of a functional computer processing systems for device control. The present disclosures may also be embodied in a computer readable product disposed on data bearing media for use with any suitable computational and data processing device with communication capabilities. Such data bearing media may be transmission media or recordable media for machine-readable information, including magnetic media, optical media, or other suitable media. Examples of recordable media include magnetic disks in hard drives or diskettes, compact disks for optical drives, magnetic tape, and others as known to those of skill in the art.

Persons skilled in the art shall immediately recognize that any computer system having suitable programming means will be capable of executing the steps of the method of the present disclosure as embodied in a computer readable product. Persons skilled in the art will recognize immediately that, although some of the exemplary embodiments described in this specification are oriented to software installed and executing on computer hardware, nevertheless, alternative exemplary embodiments implemented as firmware or as hardware or as a combination of hardware and software are well within the scope of the present disclosure.

Device Control System Exemplary Embodiment

The present disclosure provides a device control system and a device control method for constructing a physical-tovirtual spatial relationship for electronic devices to be linked and controlled. A photographic representation for the electronic devices is provided on a user interface such that a user can easily locate the electronic devices to be controlled and conduct various operation without having to go through complex device linking and control procedures.

Figure 1A:
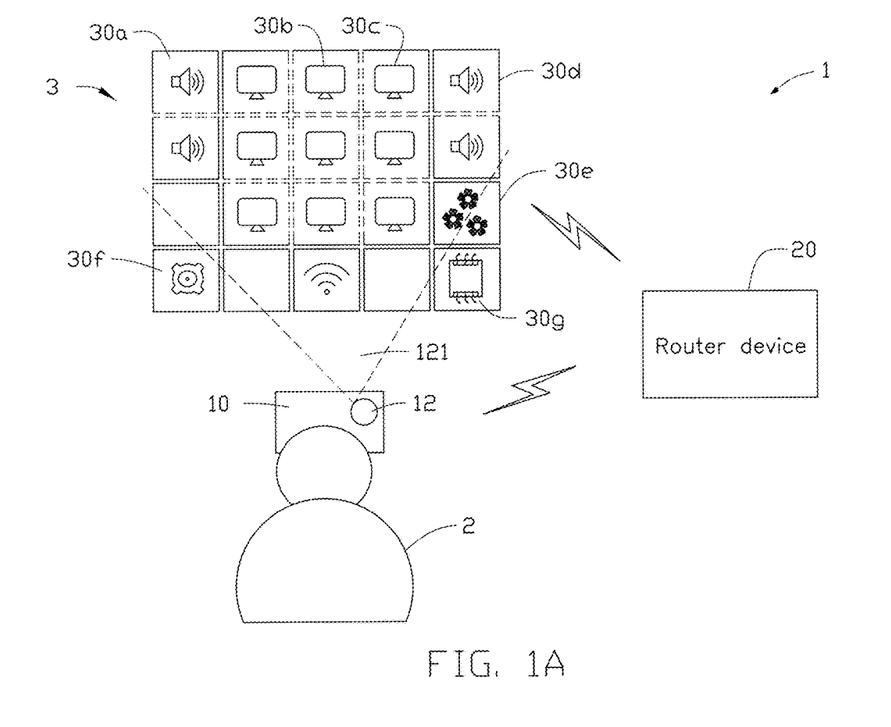
FIG. 1A is a schematic illustration of an exemplary device control system provided in accordance with exemplary embodiments of the present disclosure.

FIG. 1A is a schematic illustration of an exemplary device control system provided in accordance with exemplary embodiments of the present disclosure. Particularly, FIG. 1A shows an exemplary device control system 1 (herein after the control system 1), which comprises a surface mounted multifunctional intelligent modular system (herein after the modular system 3) mounted on a mounting surface (e.g., a wall) in a manner that all elements in the modular system 3 is observable and operable by a user 2, a portable device 10, and a router device 20.

The modular system 3 comprises a plurality of electronic devices having communication capabilities (e.g., functional module units 30a-g) mounted to the supporting surface (e.g., a wall) through one or more discrete mounting member (not shown). The functional module units 30a-g include but are not limited to a TIME display/control device 30b (herein after the TIME 30b), one or more sets of speakers 30a, 30d, a fragrance apparatus 30e, an air purifier 30g, and an alarm 30f.

In the instant embodiment, the functional module units 30a-g of the modular system 3 and the portable device 12 are connected to a communication network through the router device 20. The portable device 10 is linked to each of the functional module units 30a-g via the communication network. The functional module units 30a-g and the portable device 10 are operable to communicate and perform data/signal transmission over the communication network.

In some exemplary embodiment, the speakers 30a, 30d, the fragrance apparatus 30e, the air purifier 30g, and the alarm 30f of FIG. 1A are physically connected to the TIME 30b via cable. The TIME 30b is configured to control the operations of the speakers 30a, 30d, a fragrance apparatus 30e, the air purifier 30g, and the alarm 30f based on user-input or on a default setting (e.g., standby or sleep mode, scheduled operations, or the like).

In some exemplary embodiment, the TIME 30b, the speakers 30a, 30d, the fragrance generator 30e, the air purifier 30g, and the alarm 30f of FIG. 1A are connected to a remote cloud server for retrieving user-preference control parameters and configure accordingly. Each of the TIME 30b, the speakers 30a, 30d, the fragrance generator 30e, the air purifier 30g, and the alarm 30f may further feed the operation status information back to the remote cloud server.

In some exemplary embodiment, each of the exemplary functional module units is configured to have a flat and substantially rectangular structural profile that resembles a wall tile. The flat and geometrically regular structural configuration of the functional module units allows them to be arranged in close proximity to each other in an organized manner, so as to effectively cover a wide span of the wall. The flat construction of the functional module units also facilitates efficient space usage upon installation to the wall as the thin profile of the module units are made to reduce necessary space requirement.

In some exemplary embodiment, each of the exemplary functional module units defines a substantially rectangular-shaped viewing face arranged to face toward away the mounting surface (e.g., wall) and operatively accessible to a potential user (e.g., user 2) situated in a living/interactive environment. The planar profile (e.g., the viewing face) of the functional module units may be substantially identical.

Specifically, the router device 20 is operable to route data among the electronics devices (e.g., functional module units 30a-g) and the portable device 10 through the communication network. In one exemplary embodiment, the router device 20 can comprises of necessary hardware and firmware component for operatively monitoring and routing data over a local area network.

The portable device 10 is equipped with image capturing function and communication capability. The portable device 10 is operable by the user 2. The portable device 10 is operable to construct the physical to virtual spatial relationship of the electronic devices (e.g., functional module units 30a-g), i.e., to map the physical position of electronic devices to a virtual user interface, through the uses of image capturing and image recognition for the user 2 to control and manage using the portable device 10.

More specifically, the portable device 10 has at least one image sensor 12 and the image sensor 12 has a sensing range 12 covering a specific area, such as a surface of a wall, an area of ceiling, or a room space. In the instant embodiment, the sensing range 121 encompasses at least the wall surface having the modular system 3 mounted thereon.

Moreover, the portable device 10 has a device list stored in a built-in memory, wherein the device list contains all the electronic devices in the communication network and linked to or linkable to the portable device 10. In some exemplary embodiment, the device list may be implemented in a tabular form listing each of the electronic devices in the communication network and the associated identification number. The built-in memory may be implemented by a static random access memory (SRAM), a dynamic random access memory (e.g., DRAM, SDRAM, DDR, DDRII), a Flash memory (e.g., NAND Flash, NOR Flash), Read only memory (e.g., ROM, EPROM, EEPROM).

The portable device 10 further has an application program for device control (e.g., a smart device control application program) installed thereon for a built-in processor of the portable device 10 to execute.

The user 2 can initiate the application program on the portable device 10 via user operation in such a manner that the image sensor 12 to capture the specific area or a target area while the portable device 10 is held at hand. The image sensor 12 in the instant embodiment operates in an image capturing mode and captures the specific area at a constant frame rate (e.g., 5~10 frames per second). In another exemplary embodiment, the image sensor 12 may be configured to operate in a video capturing mode and can capture the specific area at a constant frame rate (e.g., 24~30 frames per second).

The constant frame rate of the image sensor 12 may be pre-configured before factory shipment of the portable device 10 or may be configured by the user 2 via user operations.

Figure 1B:
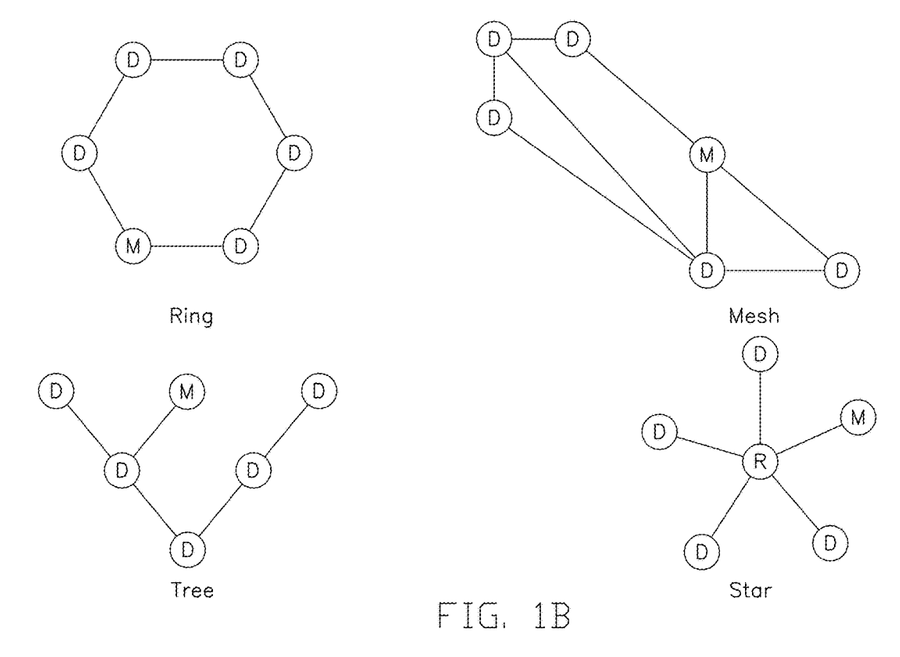
FIG. 1B is a schematic illustration of various network topologies applicable to the exemplary device control system of FIG. 1A provided in accordance with exemplary embodiments of the present disclosure.

The communication network topology adopted in the exemplary device control system of FIG. 1A is a star network topology, referring to FIG. 1B, i.e., all the electronic devices (e.g., functional modular units 30a-g or functional modular units 32a-c) denoted as "D" and the portable device 10 denoted as "M" are connected to a special gateway node denoted as "R" (i.e., the router). However, it should be noted that the usage of the network is to provide a data communication path for the electronic devices (e.g., functional modular units 30a-g or functional modular units 32a-c) and the portable device 10 for data communication, sharing of data as well as to perform control operation with each other, and the exact network topology adopted may vary depending upon the actual structure of the system and type of the functional modular units. The present disclosure is not limited thereto.

Referring again to FIG. 1B, in other embodiments, the communication network topology used by the system for linking the electronic devices (e.g., functional modular units 30a-g or functional modular units 32a-c) and the portable device 10 may be configured in any form, for example, a bus network topology, a ring network topology, a mesh network topology, a fully connected network topology, a tree or a hierarchical network topology or the like. In FIG. 1B, the electronic devices are denoted as "D", while the portable device 10 is denoted as "M".

For instance, under the bus network topology structural, all the electronic devices (e.g., functional modular units 30a-g or functional modular units 32a-c) may be configured to connect to a single bus or to Ethernet cable, with a network routing node (e.g., the router device 20) connected thereto. The portable device 10 may communicate with electronic devices through the router using correspond MAC or IP addresses. For another instance, under the ring network topology structural, the electronic devices and the portable device 10 are connected in a loop or ring form. For still another instance, under the tree network topology structural, a root node (e.g. a central controller of the system or the TIME 30b) is connected to the one or more functional modular units (e.g., the lighting modular units, the speakers 30a, 30d, the air purifier 30g, the alarm clock 30f, or the like) that are in lower level or the rank in the hierarchy by cables. The portable device 10 and the electronic devices connected in tree network topology form may be configured to connect to a single bus via cables or may be connected to a network routing device (e.g., the router device 20) via wireless connection.

Based on the above elaboration, those skilled in the art shall be able to establish the communication network based on network system and operational requirements, and thus further descriptions are hereby omitted.

In the embodiment illustrated by FIG. 1, the image sensor 12 of the portable device 10 captures at least one image of the wall surface with the modular system 3 mounted thereon and generates one or more first images containing all the functional modular units 30a-g. The processor of the portable device 10 at same time is driven to execute a device recognition and control procedure while performing image capturing function to creating a physical to virtual spatial relationship for the electronic devices in the first image. i.e., maps the physical position of the device to the virtual position of the device displayed on the display of the portable device 10.

Upon execution of the device recognition and control procedure, the portable device 10 transmits a connection signal through the communication network to a selected electronic device on the device list. The portable device 10 may transmit the connection signal in the order as listed in the device list or to a user-specific electronic device. The connection signal comprises at least an acknowledgement request, wherein the acknowledgement request asked the electronic device to provide a response. In one exemplary embodiment, the connection signal comprises an acknowledgement request and an identification association with the selected electronic device.

The portable device 10 further determines whether the selected electronic device appears in the first image captured by determining whether the response which is responsive to the connection signal has being received from the selected electronic device within a preset period (e.g., one or two seconds). In one embodiment, the portable device 10 determines whether the selected electronic device has provided an optical feedback e.g., a visible light pattern response or invisible light pattern response within the preset period using the image sensor 12.

Figure 2:
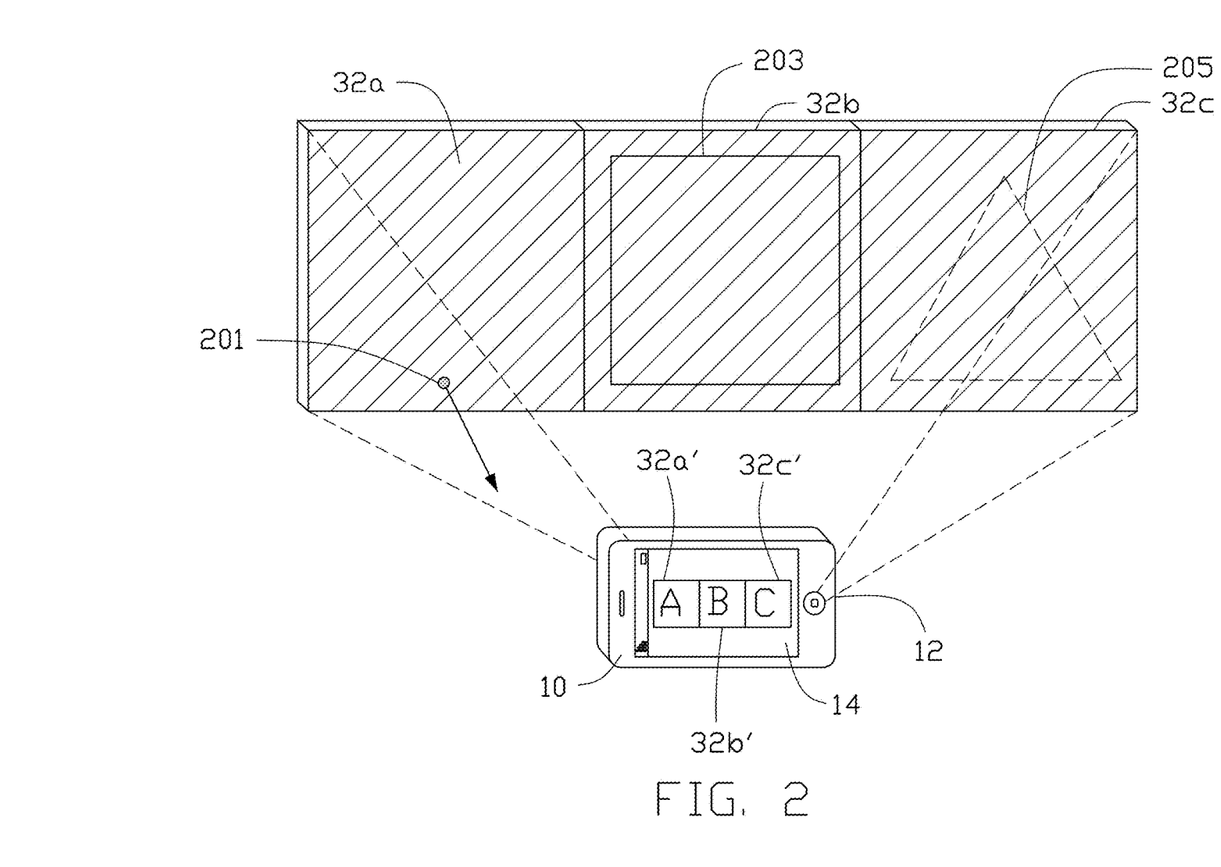
FIG. 2 is a schematic illustration of an operation to identify devices and the relative positions provided in accordance with exemplary embodiments of the present disclosure.

As illustrated in FIG. 2, the user (not shown in FIG. 2) hold the portable device 10 and enables the image sensor 12 to continue capturing images containing the electronic devices (e.g., the functional modular units 32a-c) in the specific area at a constant frame rate, the first image (e.g., the image with the functional modular units 32a-c) will be displayed on a touch display 14 of the portable device 10 with the functional modular units 32a-c displayed as object A 32a', object B 32b', and object C 32c' respectively.

Upon receiving the connection signal, each of the electronic devices (e.g., the functional modular units 32a-c) operatively provides the optical feedback response, e.g., a visible light pattern response (e.g., a geometric shape lighting signal, a colored pattern signal, a flashing signal, or a unique shape of lighting) or invisible light pattern response (e.g., an infrared signal) for the image sensor 12 of the portable device 10 to capture.

For instance, the functional modular unit 32a may be configured to transmit an invisible light response (e.g., infrared light signal 201) for the image sensor 12 to capture and recognize upon receiving the connection signal. Alternatively, the functional modular unit 32b may be configured to transmit a visible light pattern response (e.g., square-frame shaped lighting 203) for the portable device 10 to capture and recognize or the functional modular unit 32c may be configured to transmit a visible light pattern response (e.g., flashing triangular-shaped lighting 205) for the portable device 10 to capture and recognize.

In some exemplary embodiment, the electronic devices may each have a unique 1D or QR barcode representation and lighting the barcode representation or the portable device 10 to capture and recognize in response to receiving the connection signal.

It is worth mentioning that techniques such as feature recognition and objects' position identification in image captured are known image processing technique, thus further descriptions are hereby omitted.

When the portable device 10 does not detect an optical feedback from the selected electronic device, the portable device 10 determines that the selected electronic device is not in the first image and continue transmits the connection signal to the next electronic device on the device list until all the presence of electric devices of the device list has in the first image has been verified.

Conversely, when the portable device 10 detects the optical feedback from the selected electronic device within the preset period, the portable device 10 determines that the selected electronic device (e.g., the functional modular units 32a-c) is in the first image. The portable device 10 operatively identifies the relative position of the electronic device with respect to another electric device (e.g., neighboring electric device) within the first image and stores the relative position information in the built-in memory.

For instance, the portable device 10 can map the functional modular units 32a to the left most object (e.g., object A 32a'), the functional modular units 32b to the center object (e.g., object B 32b'), and the functional modular units 32c to the right most object (e.g., object C 32c'), thereby creating physical to virtual spatial relationship amount the electronic devices.

In short, the portable device 10 is capable to provide a visual representation of the electronic devices shown in the first image for the user to view and easily locate the target electronic device to operate, improving user experience.

Figure 3A:
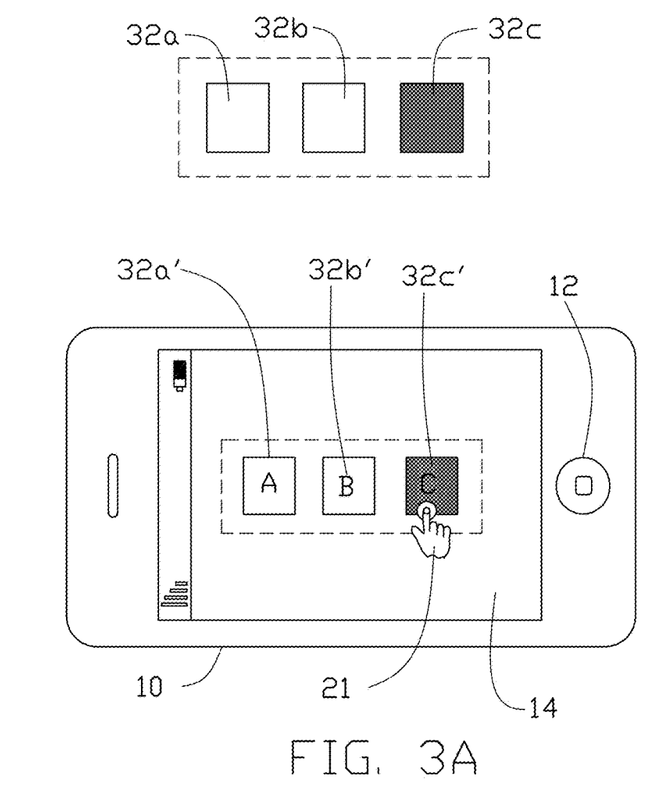
FIGS. 3A and 3B are schematic diagram illustrating a device selection and control operation in accordance with exemplary embodiments of the instant disclosure.
Figure 3B:
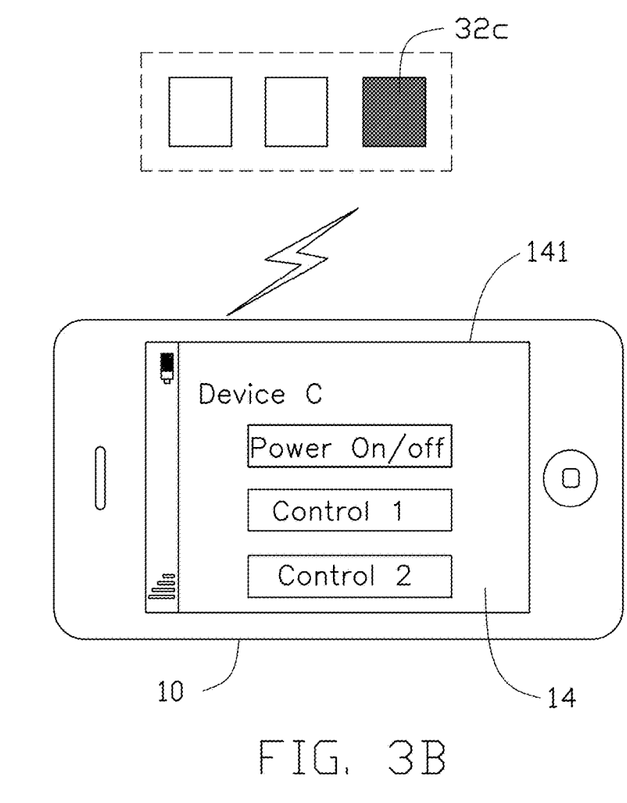

FIGS. 3A and 3B illustrate a device selection and control operation in accordance with exemplary embodiments of the instant disclosure. After the execution of the device recognition and control procedure, the application program creates a virtual layout of the electronic devices in the first image on the touch display 14 of the portable device 10 as illustrated in FIG. 3A. The user of the portable device 10 thereafter can select an electronic device (e.g., the functional modular unit 32c) to control by selecting or clicking the object C 32c' (e.g., graphic icon) via the touch display 14 of the portable device 10 to initiate a user control interface for the electronic device (e.g., the functional modular unit 32c).

An exemplary user control interface 141 for the selected electronic device (e.g., the functional modular unit 32c) may be illustrated by FIG. 3B. Take the selected electronic device (e.g., the functional modular unit 32c) to be a speaker as an illustrative example, the user control interface 141 may include on/off power control, up/down volume control.

In some exemplary embodiment, the device list may further include the control information (or control protocols) associated with each of the electronic devices (e.g., the functional modular units), the processor of the portable device 10 is operable to interpret the control information retrieved from the device list, execute a control routines, and remotely control the operation of the respective electronic device. The portable device 10 may obtain the corresponding control information from the respective electronic device through the communication network during connection establishing process or from a cloud server.

In the instant embodiment, the image sensor 12 can be implemented by an infrared image sensor, a complementary metal-oxide semiconductor (CMOS) image sensor, or a charge-coupled device (CCD) image sensor depend upon the type of portable device 12 and operational requirements.

In some exemplary embodiment, the portable device 10 may be a smart phone, a tablet, a PDA, a digital camera, a camcorder, or any other wearable device with image capturing function and the application program for device control installed thereon.

In some exemplary embodiment, the application program for device control may be pre-stored in the device before factory shipment. In some exemplary embodiment, the application program for device control may be retrieved and downloaded by the user from an external cloud server through the internet.

It is worth to note that FIG. 1A, FIG. 2, FIG. 3A, and FIG. 3B are merely used for illustrating the device control system and the device control operation thereof, and thus should not be used to limit the scope of the present disclosure.

Device Recognition and Control Method Exemplary Embodiment

Figure 4:
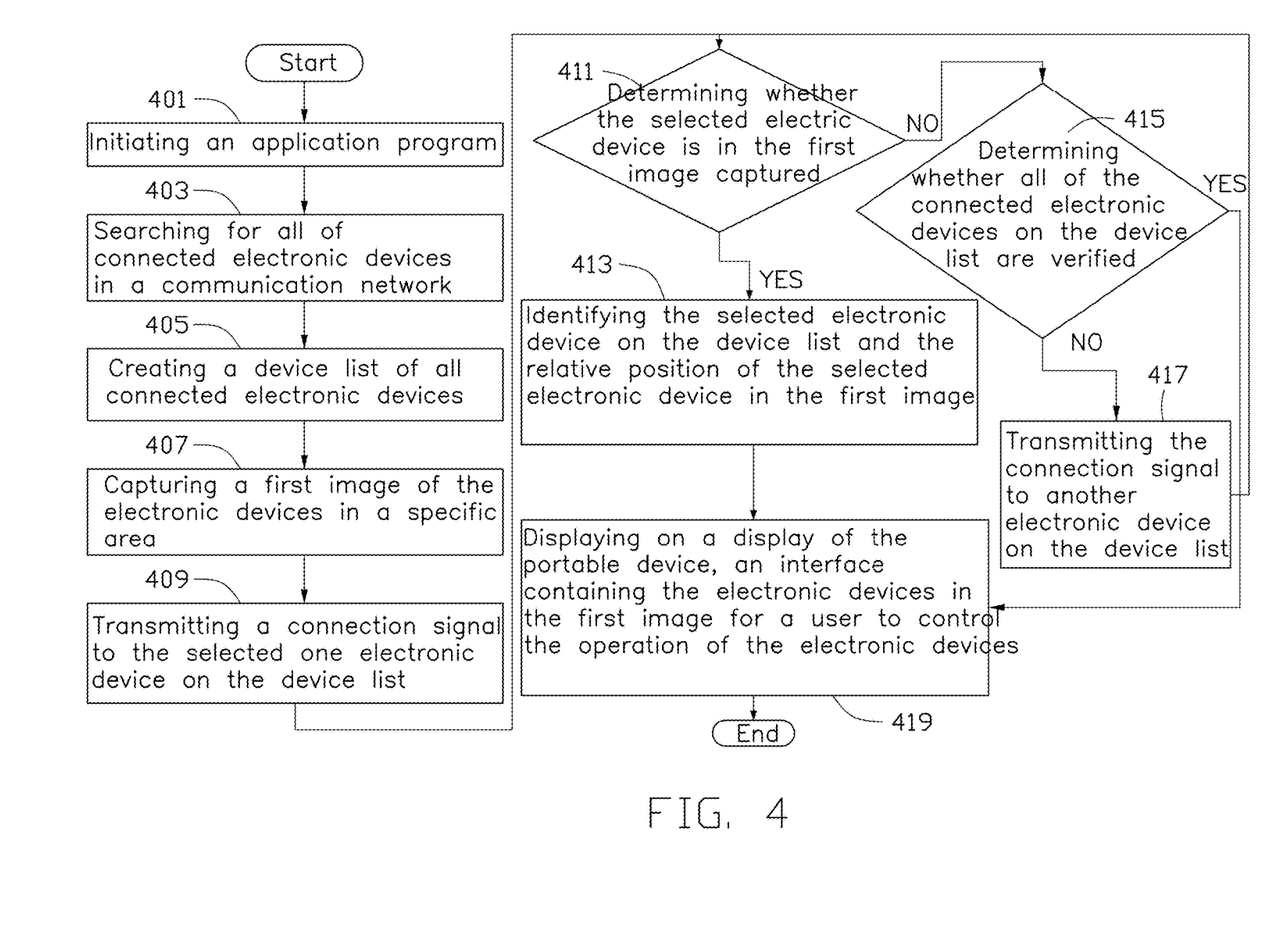
FIG. 4 shows a flowchart diagram illustrating a device control method provided in accordance with exemplary embodiment of the instant disclosure.

From the aforementioned exemplary embodiment, the present disclosure may generalize a device recognition and control method which can be applied to the device control system illustrated in the aforementioned embodiment. FIG. 4 shows a flowchart diagram illustrating a device control method provided in accordance to an exemplary embodiment of the present disclosure. The device control method can be executed by a processor of the aforementioned portable device having a built-in image sensor. The portable device also has an application program for device control installed thereon, which may be downloaded from an external server.

In block 401, the processor of the portable device initiates an application program for device control (e.g., a smart device control application program) by a corresponding user operation.

In block 403, the processor of the portable device searches over a communication network connected thereto through the router device for all of connected electronic devices. Specifically, the portable device first connects to a communication network (e.g., through a router device) to establish connections to each of electronic devices. Next, the processor of the portable device searches over a communication network to locate all the electronic devices that are connected to the communication network.

In some embodiments, the portable device communicates with the router and retrieves the information on the electronic devices connected to the communication network.

In block 405, the processor of the portable device creates a device list of all connected electronic devices in the communication network and stores the device list in a built-in memory. The built-in memory in one exemplary embodiment may be allocated by the internal memory of the processor.

In block 407, the portable device was held by the user in such a manner that the image sensor captures images of a specific area (e.g., a wall surface or a room space) with the built-in image sensor. The processor of the portable device operatively causes the image sensor to capture at least one first image of the electronic devices at a constant frame rate.

The specific area contains a number of the electronic devices, wherein the number of the electronic devices in the specific area (i.e., appeared in the first image) is less than or equal to the total number of electronic devices on the device list. The size of the specific area depends on the sensing range of the built-in image sensor. The constant frame rate of the built-in image sensor may be pre-configured before factory shipment of the portable device or may be configured by the user via user operation.

In block 409, the processor of the portable device causes the portable device to transmit a connection signal through the communication network to the selected one electronic device on the device list, wherein the connection signal comprises an acknowledgement request. In some exemplary embodiment, the connection signal comprises an acknowledgement request and an identification of the selected electronic device.

In block 411, the processor of the portable device determines whether the selected electronic device is in the first images captured by determining whether a response has being received from the selected electronic device within a preset period (e.g., one or two seconds). More specifically, the processor of the portable device determines whether an optical feedback response (e.g., a visible light pattern response or invisible light pattern response) from the selected electronic device has been detected within the preset period using the image sensor based on image detection results (i.e., based on at least one another first image captured.

Upon receiving the connection signal from the portable device, each of the electronic devices (e.g., the functional modular units 30a-g of FIG. 1A) operatively provides the optical feedback response, e.g., a visible light pattern response (e.g., a geometric shape lighting signal, a colored pattern signal, a flashing signal, or a unique shape lighting signal) or invisible light pattern response (e.g., infrared signal) for the image sensor of the portable device to capture.

In some exemplary embodiment, the electronic devices may each have a unique 1D or QR barcode representation and lighting the barcode representation or the portable device to capture and recognize in response to receiving the connection signal.

When the processor of the portable device does not detect the optical feedback response responsive to the connection signal from the selected electronic device within the preset period based on the image detection result, the processor of the portable device determines that the selected electronic device is not in the first image and executes block 415. Conversely, when the processor of the portable device detects the optical feedback responsive to the connection signal from the selected electronic device within the preset period based on the image detection result, the processor of the portable device determines that the selected electronic device (e.g., the functional modular units 32*a-c*) is in the first image and executes block 413.

In block 413, the processor of the portable device operatively identifies the relative position of the electronic device with respect to another electric device in the first image and stores the relative position information in the built-in memory and executes block 419.

In block 415, the processor of the portable device determines whether all of connected electronic devices on the device list has been verified. When the processor of the portable device determines that not all of connected electronic devices on the device list has been verified, the processor of the portable device executes block 417. On the other hand, when the processor of the portable device determines that all of connected electronic devices on the device list has been verified, the processor of the portable device executes block 419.

In block 417, the processor of the portable device causes the portable device transmit the connection signal to the next electronic device on the device list and returns to block 411, i.e., the processor of the portable device continue the connection signal transmission process until all the presences of electric devices of the device list has in the first image are verified.

In block 419, the processor of the portable device causes a display of the portable device to display a user interface containing relative position information for the electronic device in the first image for the user to view and control the operation of the electronic devices in the first image via user operation (e.g., a touch input). The processor of the portable device transmit the control signal to the respective electronic device for configuration the operation of the selected electronic device based on a user-input operation (e.g., a touch input)

In some exemplary embodiment, the processor of the portable device 10 is operable to retrieve the control information associated with the selected electronic device from the device list and execute a control routine to remotely control the operation of the selected electronic device.

Figure 5:
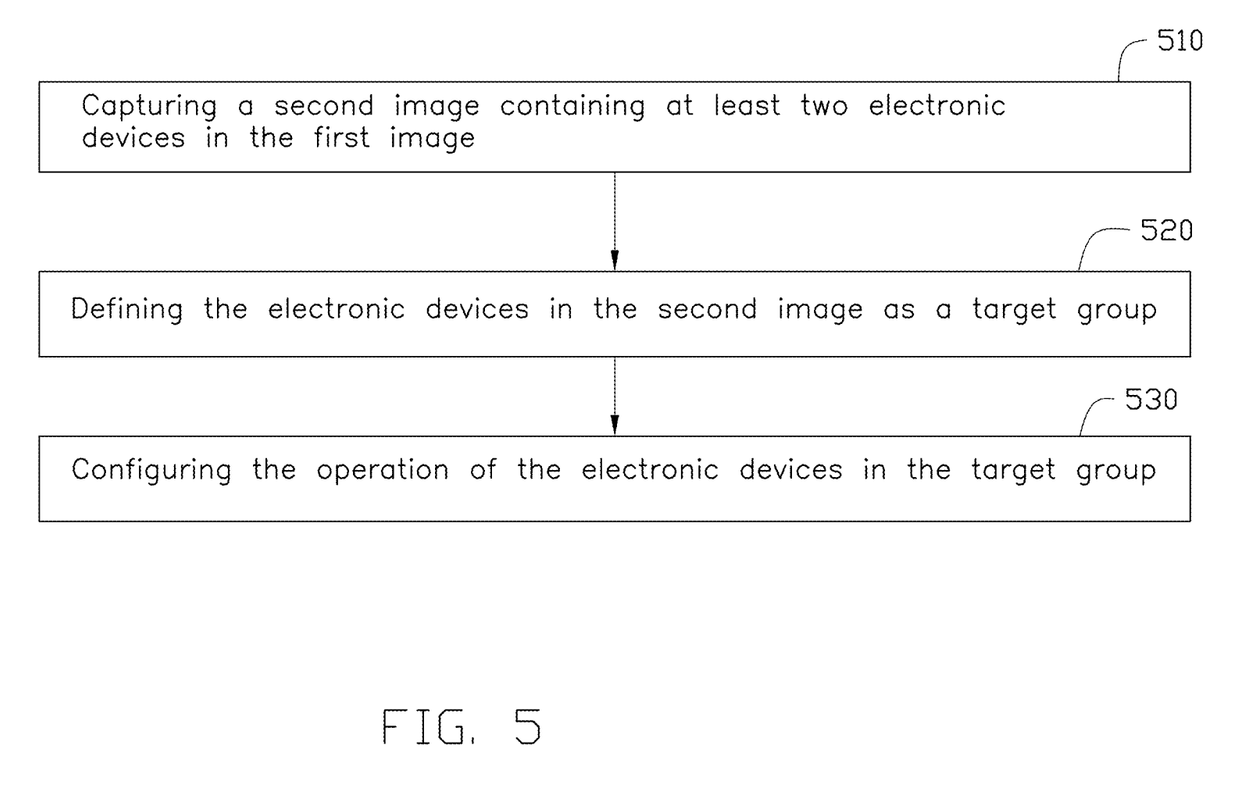
FIG. 5 shows a flowchart diagram illustrating a device grouping method provided in accordance with exemplary embodiments of the instant disclosure.
Figure 6:
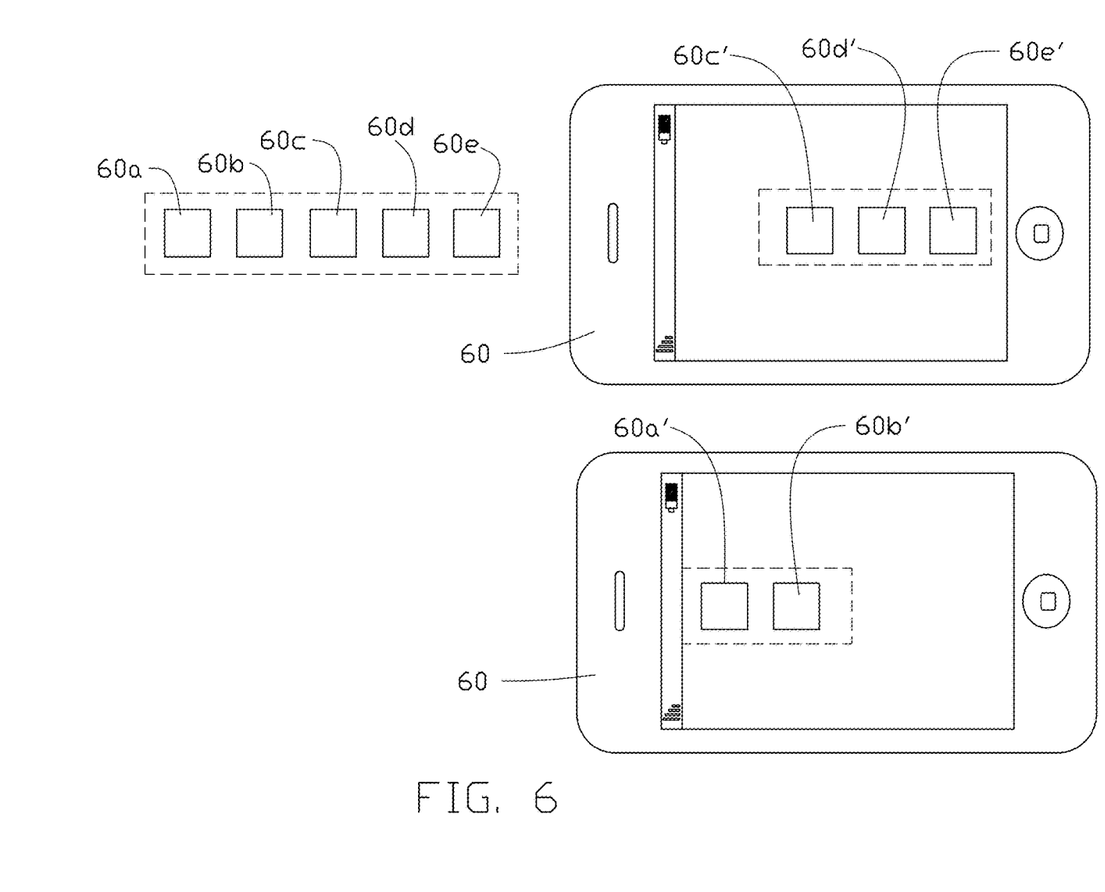
FIG. 6 shows a schematic illustration of device grouping operation provided in accordance with exemplary embodiments of the instant disclosure.

In some exemplary embodiment, after the physical-virtual position relationship of the electronic devices in the first image has been identified, the electronic devices may be grouped in a desired manner. FIG. 5 shows a flowchart diagram illustrating device grouping method provided in accordance with exemplary embodiments of the instant disclosure. FIG. 6 shows a schematic illustration of device grouping operation provided in accordance with exemplary embodiments of the instant disclosure.

In block 510, upon receiving a user selection operation of at least two electronic devices appeared in the first image captured while still capturing the image of the specific area, the processor of the portable device causes the image sensor of the portable device to capture at least one second image containing the at least two electronic devices from the electronic devices (e.g., the electronic devices 60*a-e*) appeared in the first image, e.g., a first group image containing 60*c'*, 60*d'*, 60*e'* and a second group image containing 60*a'*, 60*b'*. The number of electronic devices appeared in the second image is less than or equal to the number of the electronic devices appeared in the first image.

In block 520, the processor of the electronic device defines the electronic devices in the second image as functional groups e.g., electronic devices 60*c-e* corresponding 60*c'*, 60*d'*, 60*e'* as the first functional group and electronic devices 60*a-b* corresponding 60*a'*, 60*b'* as the second functional group. The processor of the electronic device may define the functional group by linked the operations of the two electronic devices together for the user to control or create a group control user interface on the display of the portable device for the user to view and operate therefrom.

In block 530, the processor of the electronic device configure the operations of the electronic devices based on a user input operation e.g., a touch input.

For instance, the user may configure one of the electronic devices in the functional group as a master device and the remaining electronic device as slave devices. The electronic device that is configured to be the master device is operable to control the operations of the slave devices based on user input.

For another instance, by grouping the selected electronic devices into a target group (e.g., functional group), the user may control the operations of the electronic devices at the same time, such as power on/off at the same time or operate at same conditions (e.g., scheduling operation time)

The present disclosure further provides an implementation for the portable device. The portable device comprises a memory, a processor, an image sensor, a display, and a communication unit. The memory, the image sensor, the display, and the communication unit are coupled to the processor.

More specifically, the image sensor operatively captures an image of a specific area, wherein the image containing a number of connected electronic devices in the specific area. The number of connected electronic devices contained in the specific area (i.e., appeared in the first image) is less than or equal to the total number of electronic devices on a device list.

The communication unit operatively connects to the communication network by connecting to a router (e.g., the router device 20 of FIG. 1A) in a wired or wireless manner. The memory stores a device list containing all connected electronic devices in the communication network, the images captured by the image sensor, operational data for the processor to execute the device recognition and control procedure.

The display operates display a visual representation of electronic devices connected to the communication network (of which the portable device is connected to) and appeared in the image captured for the user to view.

The processor, which is the operational core for the portable device, is configured to operatively executes the device recognition and control procedure for identifying the presence and the associated position of the electronic devices in the specific area and creating a virtual device control information on the display, which maps the physical to virtual spatial relationship of the electronic devices in the image captured, for the user of the portable device to operate and control.

The processor may be implemented by a processing chip such as a digital signal processor or embedded microcontroller, programmed with necessary firmware for controlling the operations of the memory, the image sensor, the display and the communication unit and executing the device recognition and control procedure. The memory may be a memory section of the processing chip, a volatile memory chip, or a nonvolatile memory chip such as a flash memory chip, a read-only memory chip, or a random access memory chip. The communication unit may a communication processing chip capable of connecting to a local communication network through the router and a remote cloud server through the internet.

In some exemplary embodiments, the portable device is operable to connect the electronic device that is captured in the first image but is not yet connected to the communication network that the portable device is currently connected to. More specifically, when the processor of the portable device determines that there is an electronic device in the first image that is not on the device list, the portable device operatively perform a device search via near field scanning or Bluetooth scanning techniques and locate the respective electronic device for paring. After paired, the processor of the portable device transmits the communication network information (such as the ip address of the router device) to the respective electronic device for the respective electronic device to connect to the communication network.

Accordingly, the present disclosure provides a device control mechanism, which not only is able to create a visual representation that maps the physical positions of the electronic devices to be controlled detected to the virtual layout displayed on the device for the user to easily view and control electronic device operations, the device control mechanism also incorporates a device grouping mechanism by image capturing for the user to flexibly and quickly control the operation of a group electronic devices. Thereby, reducing the device control time and increase user experience.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A device control method for a portable device with image capturing function and being connected to a communication network, comprising:
   capturing, by the portable device, a first image of a specific area, wherein the first image containing a number of electronic devices connected to the communication network within the specific area; and
   executing, by the portable device, a device recognition and control procedure, comprising:
   a) transmitting, by the portable device through the communication network, a connection signal to a selected electronic device on a device list, wherein the device list containing all electronic devices connected to the communication network;
   b) determining, by the portable device, whether the selected electronic device is appeared in the first image captured based on whether a response from the selected electronic device has been received within a preset period;
   c) identifying, by the portable device, the selected electronic device on the device list and a relative position of the selected electronic device with respect to another electric device in the first image captured upon determining that the selected electronic device is in the first image; and
   d) transmitting, by the portable device, the connection signal to another electronic device on the device list and repeating, processes b) and c) until all the connected electronic devices on the device list are verified, to identify the relative positions of all electronic devices contained in the first image.

2. The method according to claim 1, further comprising:
   displaying, by the portable device, on a display of the portable device the electronic devices connected to the communication network and appeared in the first image;
   receiving, by the portable device, a touch input to select one of the electronic devices on the display; and
   configuring, by the portable device, an operation of the selected electronic device based on a user-input operation.

3. The method according to claim 1, wherein the connection signal comprising an acknowledgement request.

4. The method according to claim 1, wherein the process of determining whether the selected electronic device is in the image captured further comprises:
   capturing, by the portable device, at least one another first image of the specific area;
   determining, by the portable device, whether the selected electronic device has sent an optical feedback responsive to the connection signal within the preset period based on the first image captured; and
   determining, by the portable device, that the electronic device is in the first image upon receiving the optical feedback responsive to the connection signal from the selected electronic device within the preset period.

5. The method according to claim 4, wherein the process of determining whether the selected electronic device is in the first image captured further comprises:
   determining, by the portable device, that the electronic device is not in the first image if the portable device does not receive the optical feedback from the selected electronic device within the preset period.

6. The method according to claim 4, wherein the selected electronic device transmitting the optical feedback corresponding to the connection signal received by transmitting an infrared signal, a visible light signal, or a flash signal.

7. The method according to claim 1, further comprising:
   capturing, by the portable device, a second image containing at least two electronic devices appeared in the first image;
   grouping, by the portable device, the electronic devices into a functional group based on the second image captured; and
   configuring, by the portable device, the operations of the electronic devices in the functional group defined based on a user-input operation.

8. The method according to claim 7, further comprising:
   configuring, by the portable device, a master device from the group and the remaining electronic devices in the group as slave devices, wherein the master device is operable to control the operation of the slave devices.

9. The method according to claim 7, wherein the number of electronic devices appeared in the second image is less than or equal to the number of the electronic devices appeared in the first image.

10. The method according to claim 1, further comprising a connection establishing process, which comprises:
connecting, by the portable device, to the communication network; and
establishing, by the portable device, the connection to each of electronic devices through the communication network.

11. A system, comprising:
a plurality of electronic devices configured to establish a communication network;
a portable device having image capturing function, being connected to the communication network and communicable with the electronic devices, wherein the portable device is operable to;
capture a first image of a specific area, wherein the first image containing a number of electronic devices connected to the communication network within the specific area; and
execute a device recognition and control procedure, comprising:
a) transmitting a connection signal through the communication network to the selected one electronic device on a device list, wherein the device list containing all electronic devices connected to the communication network;
b) determining whether a selected electronic device is appeared in the first image captured based on whether a response from the selected electronic device has be received within a preset period;
c) identifying the selected electronic device on the device list and the relative position of the selected electronic device with respect to another electric device in the first image captured upon determining that the selected electronic device is in the first image; and
d) transmitting, by the portable device, the connection signal to another electronic device on the device list and repeating, processes b) and c) until all the connected electronic devices on the device list are verified, to identify the relative positions of all electronic devices contained in the first image.

12. The system according to claim 11, where the portable device is configured to further execute a device control procedure comprising:
displaying on a display of the portable device the identified electronic devices connected to the communication network and appeared in the first image;
receiving a touch input to select one of the electronic devices on the display; and
configuring the operation of the selected electronic device based on a user-input operation.

13. The system according to claim 11, wherein the process of step b) further comprises:
capturing at least one another first image of the specific area;
determining whether the selected electronic device has sent an optical feedback responsive to the connection signal within a preset period based on the first image captured; and
determining that the electronic device is in the first image upon receiving the optical feedback responsive to the connection signal from the selected electronic device within the preset period.

14. The system according to claim 11, wherein the portable device being further configured to:
capture a second image that contains at least two electronic devices appeared in the first image;
group the electronic devices into a functional group based on the second image captured; and
configure the operations of the electronic devices in the functional group defined based on a user-input operation.

15. The system according to claim 14, wherein the portable device being further configured to:
configuring, by the portable device, a master device from the group and the remaining electronic devices in the group as slave devices, wherein the master device is operable to control the operation of the slave devices.

16. The system according to claim 14, wherein the number of electronic devices appeared in the second image is less than or equal to the number of the electronic devices appeared in the first image.

17. A non-transitory compute readable medium having instructions which when executed by a processor of a portable device with image capturing function perform a method comprising:
causing the portable device to capture a first image of a specific area, wherein the first image containing a number of electronic devices connected to a communication network within the specific area; and
causing the portable device to execute a device recognition and control procedure, comprising:
a) transmitting a connection signal through the communication network to a selected electronic device on a device list, wherein the device list containing all electronic devices connected to the communication network;
b) determining whether the selected electronic device is in the first image captured based on whether a response from the selected electronic device has been received within a preset period;
c) identifying the selected electronic device on the device list and the relative position of the selected electronic device with respect to another electric device in the image captured upon determining that the selected electronic device is in the image; and
d) transmitting, by the portable device, the connection signal to another electronic device on the device list and repeating, processes b) and c) until all the connected electronic devices on the device list are verified, to identify the relative positions of all electronic devices contained in the first image.

18. The non-transitory compute readable medium according to claim 17, further comprising:
causing the portable device to display the identified electronic devices connected to the communication network and appeared in the first image on a display of the portable device;
causing the portable device to receive a touch input to select one of the electronic devices on the display; and
causing the portable device to configure the operation of the selected electronic device based on a user-input operation.

19. The non-transitory compute readable medium according to claim 17, wherein the execution of process b) further comprises causing the portable device, to capture at least one another first image of the specific area;

causing the portable device to determine whether the selected electronic device has sent an optical feedback responsive to the connection signal within the preset period based on the first image captured; and causing the portable device to determine that the electronic device is in the first image upon receiving the optical feedback responsive to the connection signal from the selected electronic device within the preset period.

20. The non-transitory compute readable medium according to claim 17, wherein the network paring method further comprising causing the portable device to capture a second image containing at least two electronic devices appeared in the first image;

causing the portable device to group of the electronic devices into a functional group based on the second image captured; and configuring, by the portable device, the operations of the electronic devices in the functional group based on a user-input operation.

\* \* \* \* \*